US011993080B2

(12) United States Patent
Kawaguchi et al.

(10) Patent No.: US 11,993,080 B2
(45) Date of Patent: May 28, 2024

(54) DRIVE CIRCUIT OF RECORDING HEAD AND IMAGE RECORDER

(71) Applicant: Konica Minolta, Inc., Tokyo (JP)

(72) Inventors: Shinichi Kawaguchi, Sagamihara (JP); Hajime Nakamura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 235 days.

(21) Appl. No.: 17/617,780

(22) PCT Filed: Jun. 17, 2019

(86) PCT No.: PCT/JP2019/023847
§ 371 (c)(1),
(2) Date: Dec. 9, 2021

(87) PCT Pub. No.: WO2020/255188
PCT Pub. Date: Dec. 24, 2020

(65) Prior Publication Data
US 2022/0227129 A1 Jul. 21, 2022

(51) Int. Cl.
*B41J 2/045* (2006.01)

(52) U.S. Cl.
CPC ......... *B41J 2/04541* (2013.01); *B41J 2/0458* (2013.01); *B41J 2/04581* (2013.01); *B41J 2/04588* (2013.01)

(58) Field of Classification Search
CPC .. B41J 2/04541; B41J 2/0458; B41J 2/04581; B41J 2/04588
See application file for complete search history.

(56) References Cited

FOREIGN PATENT DOCUMENTS

| | | | | |
|---|---|---|---|---|
| CN | 107614268 A | * | 1/2018 | ................ B41J 2/01 |
| CN | 107614268 A | | 1/2018 | |
| JP | 2005-169737 A | | 6/2005 | |

OTHER PUBLICATIONS

PCT, International Search Report for the corresponding application No. PCT/JP2019/023847, dated Aug. 27, 2019, with English translation.
PCT, Written Opinion of ISA for the corresponding application No. PCT/JP2019/023847, dated Aug. 27, 2019, with English translation.
Office Action dated Oct. 18, 2022, for the corresponding Chinese application No. 201980097502.1, with English translation.

* cited by examiner

*Primary Examiner* — Jason S Uhlenhake
(74) *Attorney, Agent, or Firm* — LUCAS & MERCANTI, LLP

(57) ABSTRACT

A drive circuit of a recording head having a recording element is provided. The drive circuit supplies a load element for recording operation of the recording element with an output signal of electric power according to operation of the load element. The drive circuit includes a voltage amplifier that amplifies a voltage of an analog drive waveform signal for operation of the recording element to generate a drive voltage signal. The voltage amplifier includes amplifiers. Among the amplifiers, at least one of subsequent-stage amplifiers which are a second and subsequent amplifiers from an upstream side includes a signal feedback unit that returns a signal to be output to an input side of the subsequent-stage amplifiers.

19 Claims, 10 Drawing Sheets

DRIVE CIRCUIT OF RECORDING HEAD AND IMAGE RECORDER

CROSS REFERENCE TO RELATED APPLICATION

This Application is a 371 of PCT/JP2019/023847 filed on Jun. 17, 2019, the above application is incorporated herein by reference.

TECHNICAL FIELD

The invention relates to a drive circuit of a recording head and an image recorder.

BACKGROUND ART

Conventionally, some image recorders record an image on a recording medium by operating a recording element. Among them, recording elements that record images with ink include a piezoelectric recording element and a thermal recording element. In the piezoelectric recording element, a piezoelectric element and a diaphragm are provided along a wall of an ink flow path (pressure chamber). A voltage is applied to the piezoelectric element to deform it. Ink is ejected from a nozzle by compressing and deforming the ink flow path. In the thermal recording element, a resistance element is provided along an ink flow path. An electric current is applied to the resistance element so that the resistance element generates heat. It heats and bubbles ink in the ink flow path. It compresses the ink and ejects it.

A square waveform or a trapezoidal waveform is mainly used as a drive waveform of a load element for operation (recording operation) of a recording element. A voltage and a current required to operate a recording element are larger than a voltage and a current used to send and receive signals of digital data. Therefore, in an image recorder, analog conversion is performed on digital data of the drive waveforms. The digital data is amplified at a high amplification rate, and then applied to a load element. Since it is especially difficult to amplify a voltage of a digital signal to a drive voltage in one step, the image recorder includes voltage amplifiers in multiple steps. A drive voltage waveform and its voltage applied to a load element, such as a piezoelectric element or a resistance element, must be properly maintained for proper control according to an amount of operation of a recording element, for example, to eject ink droplets in a proper amount, shape and speed.

However, these amplification circuits include factors in various biases and factors in distortion of an output waveform. In contrast, Patent Literature 1 discloses a technique for outputting corrected voltage waveform data. The voltage waveform data is corrected with prediction of causes of an output voltage shift and output waveform distortion that occur in a current amplifier circuit.

CITATION LIST

Patent Literature

Patent Literature 1: JP 2005-169737 A

SUMMARY OF INVENTION

Technical Problem

However, presence or absence of output voltage shift and voltage waveform distortion, as well as their magnitude, depends on various conditions, such as characteristics of elements in a drive circuit and temperature of wiring. The number of recording elements and an operating frequency increase in accordance with required improvement in image quality and the like. As a result, a range of power consumption corresponding to the number of load elements operated at once and required waveform accuracy have become very large. Therefore, it is difficult to obtain in advance voltage waveform data in which output voltage shift and voltage waveform distortion are accurately corrected according to output status. Control becomes very complicated. It is a problem.

It is an object of the present invention to provide a drive circuit of a recording head and an image recorder which more easily and stably outputs signals with good frequency response to a load element of the recording head.

Solution to Problem

To achieve the object, the invention according to claim 1 is a drive circuit of a recording head having a recording element, the drive circuit supplying a load element for recording operation of the recording element with an output signal of electric power according to operation of the load element, and the drive circuit including:

a voltage amplifier that amplifies a voltage of an analog drive waveform signal for operation of the recording element to generate a drive voltage signal, wherein the voltage amplifier includes amplifiers, and among the amplifiers, at least one of subsequent-stage amplifiers which are a second and subsequent amplifiers from an upstream side includes a signal feedback unit that returns a signal to be output to an input side of the subsequent-stage amplifiers.

The invention according to claim 2 is the drive circuit for the recording head according to claim 1, wherein each of the subsequent-stage amplifiers includes a transistor that performs amplification.

The invention according to claim 3 is the drive circuit for the recording head according to claim 1 or 2, wherein the signal feedback unit is included in one of the subsequent-stage amplifiers which has a highest amplification factor.

The invention according to claim 4 is the drive circuit for the recording head according to claim 2 or 3, wherein the subsequent-stage amplifiers include two emitter ground circuits, and the signal feedback unit connects the two emitter ground circuits.

The invention according to claim 5 is the drive circuit for the recording head according to claim 2 or 3, wherein the subsequent-stage amplifiers include an emitter ground circuit and a cascode circuit, and the signal feedback unit connects a collector on an output side of the cascode circuit to an emitter of the emitter ground circuit.

The invention according to claim 6 is the drive circuit for the recording head according to claim 4 or S, wherein a potential difference between a supplied source voltage and an output voltage of a transistor of the emitter ground circuit at an input end of the subsequent-stage amplifier is equal to or less than a predetermined reference voltage.

The invention according to claim 7 is the drive circuit for the recording head according to any one of claims 2 to 6, wherein an operational amplifier is used as a preceding-stage amplifier which is a first amplifier among the amplifiers.

The invention according to claim 8 is the drive circuit for the recording head according to any one of claims 1 to 7, further including:

a current amplifier that amplifies a current of the drive voltage signal and outputs the amplified current as the output signal.

The invention according to claim 9 is the drive circuit of the recording head according to claim 8, further including:

a feedback unit that negatively feeds back a feedback signal according to a voltage of the output signal to the voltage amplifier.

The invention according to claim 10 is the drive circuit of the recording head according to claim 8 or 9, wherein the current amplifier comprises two sets of transistors that amplify a current by push-pull operation.

The invention according to claim 11 is the drive circuit of the recording head according to claim 10, wherein the two sets of transistors are both FETs.

The invention according to claim 12 is the drive circuit of the recording head according to claim 10, wherein the two sets of transistors are both bipolar transistors.

The invention according to claim 13 is the drive circuit of the recording head according to any one of claims 10 to 12, further including:

a bias generation unit that generates a predetermined bias voltage between the drive voltage signals supplied to the two sets of transistors.

The invention according to claim 14 is the drive circuit for the recording head according to claim 13, wherein the bias voltage generated by the bias generator is smaller than a sum of operation threshold voltages of the two sets of transistors.

The invention according to claim 15 is the drive circuit of the recording head according to claim 13 or 14, wherein the bias generation unit includes:

a bipolar transistor connected between input ends of the two sets of transistors; and resistance elements that connect (i) a base and an emitter and (ii) the base and a collector of the bipolar transistor, respectively.

The invention according to claim 16 is the drive circuit of the recording head according to any one of claims 8 to 15, further including:

a resistance element that includes:

one end connected to an output of the current amplifier, and another end that outputs the output signal.

The invention according to claim 17 is an image recorder, including:

the drive circuit of the recording head according to any one of claims 1 to 16; and the recording head to which the output signal is input.

Advantageous Effects of Invention

The present invention achieves advantageous effect of more easily and stably outputting signals with good frequency response to a load element of a recording head.

DESCRIPTION OF EMBODIMENTS

Hereinafter, embodiments of the present invention will be described with reference to the drawings.

Figure 1:
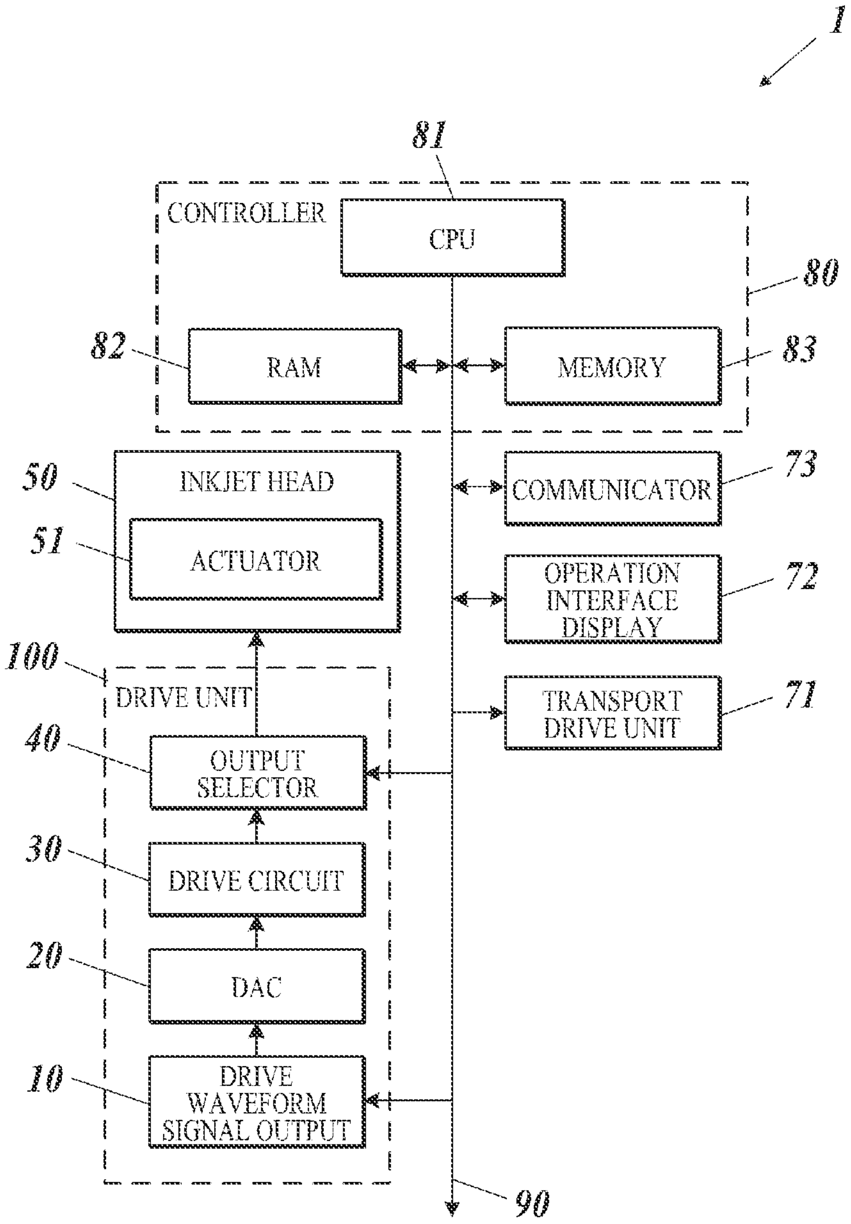
FIG. 1 is a block diagram showing a functional configuration of an inkjet recorder which is an embodiment of an image recorder of the present invention.

FIG. 1 is a block diagram showing a functional configuration of an inkjet recorder which is an embodiment of an image recorder of the present invention.

The inkjet recorder 1 includes an inkjet head drive unit 100, an inkjet head 50 (recording head), a transport drive unit 71, an operation interface display 72, a communicator 73, a controller 80, and a bus 90.

The drive unit 10M includes a drive waveform signal output 10, a digital-to-analog converter unit 20 (DAC), a drive circuit 30 (a drive circuit for a recording head of the embodiment), and an output selector 40. The drive unit 100 outputs a drive voltage signal to an actuator 51 of a selected nozzle. The drive voltage signal causes ink to be ejected at appropriate time from the selected nozzle in the inkjet head 50. The drive waveform signal output 10 outputs digital data in synchronization with clock signals input from an oscillation circuit (not shown). The digital data has drive waveforms according to ink ejection and non-ejection (including interruption and termination of image recording). The DAC 20 converts a drive waveform of the digital data into an analog signal and outputs it as an input signal Vin (analog drive waveform signal) to the drive circuit 30.

The drive circuit 30 generates a drive voltage signal Vd by amplifying a voltage of the input signal Vin according to a drive voltage of the actuator 51. Further, the drive circuit 30 performs current amplification according to a current flowing through the actuator 51, and outputs the result as an output signal Vout.

The output selector 40 outputs a switch signal. The switch signal selects the actuator **5*l* to which the output signal Wout is to be output according to pixel data of an image which is input from the controller 80** and which is to be recorded.

The inkjet head 50 is provided with recording elements. Each recording element includes a nozzle and an actuator 51 (load element) for ink ejection operation from the nozzle. Nozzle openings are arranged in a predetermined pattern on a nozzle surface of the inkjet head 50. The inkjet head 50 ejects ink from the nozzles by operation of load elements in response to drive signals from the drive unit 100. Thereby, the inkjet head 50 records an image on a recording medium. The actuator 51 can be any, although, in the embodiment, the actuator 51 is a piezoelectric element. The piezoelectric elements are provided along ink flow paths to the nozzles. A drive voltage output from the drive circuit 30 is applied to each of the actuators 51. It deforms the actuator 51 and changes a pressure applied to ink in the ink flow path. In response to the pressure change, ink with an appropriate volume, speed and droplet shape is ejected from a nozzle opening.

A transport drive unit 71 acquires a recording medium on which an image has not been recorded from a paper feeder and supplies the recording medium to a position facing the nozzle surface of the inkjet head 50. The transport drive unit 71 ejects the recording medium on which an image has been recorded from the position facing the nozzle surface. Ina case where the inkjet head 50 records an image on a surface of a recording medium by ejecting ink while the inkjet head 50 moves the recording medium, the transport drive unit 71 causes the recording medium to be transported at time suitable for output of the drive voltage signal from the inkjet head 50 and/or the switch signal by the output selector 40. The transport drive unit 71, for example, rotates a cylindrical drum or an endless belt. A recording medium is placed on an outer periphery of the cylindrical drum or tie endless belt. A recording medium acquired from the paper feeder is not limited to paper, but may be various other recording media. For example, cloth, ceramics, and plastics may be used as recording media.

The operation interface display 72 accepts input operation from an external source, such as a user, and displays status information and/or menus of image recording.

For example, the operation interface display 72 includes:

a display screen of a liquid crystal panel and a driver of the liquid crystal panel as a display; and a touch panel overlaid on the liquid crystal screen as an operation interface.

The operation interface display 72 outputs operation detection signals to the controller 80 in accordance with:

a position where touch operation is performed by a user, and a type of operation.

The operation interface display 72 may further include an LED (light emitting diode) lamp and a push button switch. For example, The LED lamp indicates a warning and/or power supply to a main power source. The push button switch accepts operations, such as switching power supply to the main power source and/or forced termination operation, and outputs an operation detection signal.

The communicator 73 transmits and receives data to and from the outside in accordance with a predetermined communication standard.

Various well-known methods, such as TCP/IP connection for communication using a LAN (local area network) cable, a wireless LAN (IEEE 802.11), short-range wireless communication such as Bluetooth (registered trademark) (IEEE 802.15, etc.), and USB (universal serial bus) connection, can be adopted as communication standards.

Tie communicator 73 includes:

connection terminals for available communication standards; and driver hardware for communication connection (network card).

The controller 80 comprehensively controls overall operation of the inkjet recorder 1. The controller 80 includes a CPU 81 (central processing unit), RAM 82 (random access memory), and memory 83. The CPU 81 performs arithmetic processing of various kinds to comprehensively control the inkjet recorder 1. The RAM 82 provides the CPU 81 with a working memory space and temporarily stores data. The memory 83 stores a control program executed by the CPU 81, setting data, and the like. The memory 83 temporarily stores image data of images to be recorded. The memory 83 includes volatile memory such as DRAM and a non-volatile storage medium such as a hard disk drive (HDD) and flash memory. They are used for different purposes.

The bus 90 is a communication path that connects the components to send and receive data.

Next, a configuration of the drive unit 100 will be described in detail.

Figure 2:
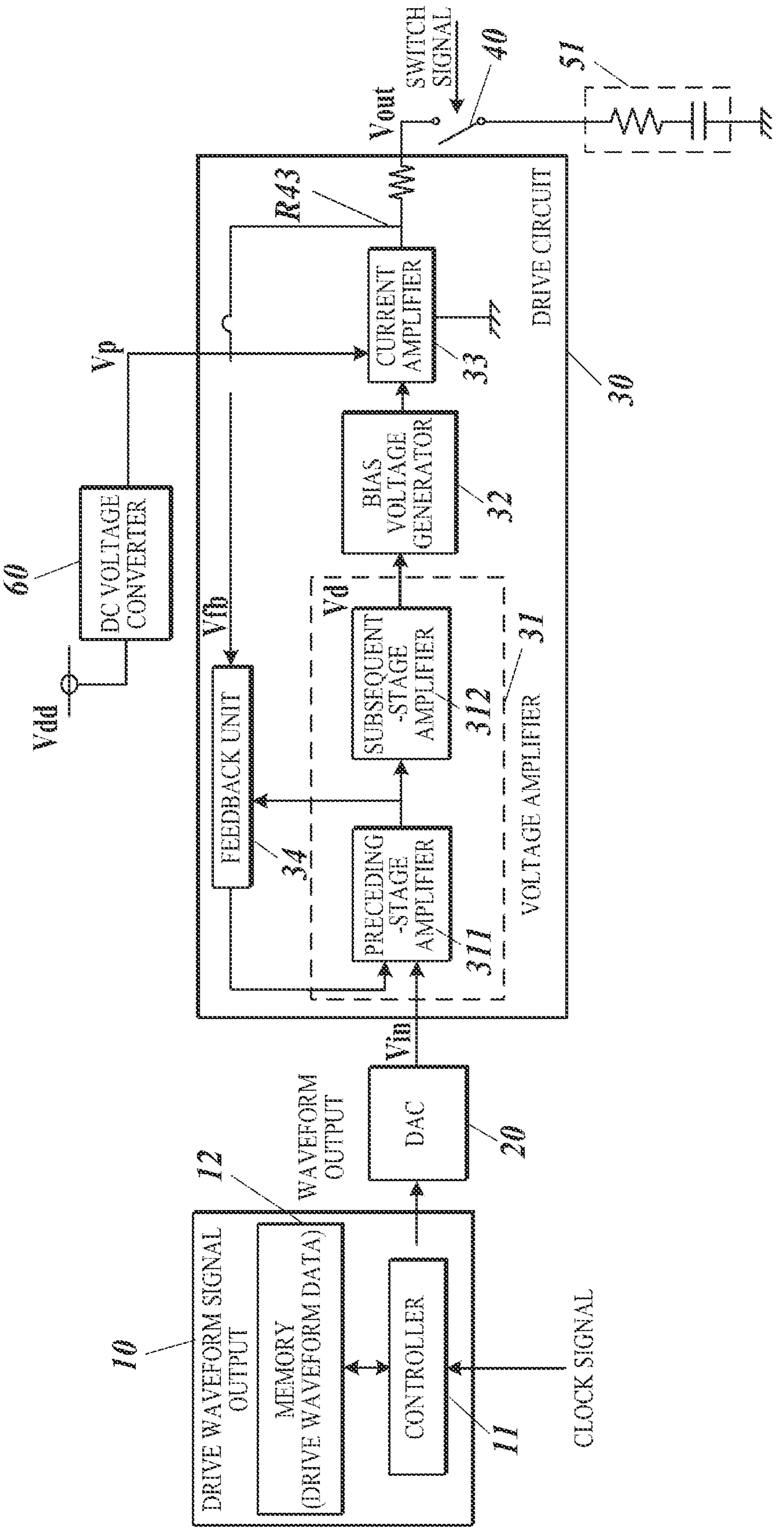
FIG. 2 is a block diagram of a drive circuit.

FIG. 2 is a block diagram showing a functional configuration of the drive unit 100.

The drive waveform signal output 10 includes a controller 1I and memory 12. The controller 11 reads, from the memory 12, digital values corresponding to a changing drive voltage based on waveform pattern data of a drive waveform signal output in synchronization with the clock signal. The controller 11 outputs them sequentially. The memory 12 is non-volatile memory that holds the waveform pattern data of the drive waveform signal that can be output by the inkjet recorder 1. This digital value is converted to an analog voltage value by the DAC 20 and becomes an analog signal with a continuous voltage change.

The DAC 20 is a well-known digital-to-analog converter and may include a low-pass filter. The low-pass filter makes a value continuously vary between input digital discrete values as necessary, depending on a sampling frequency and tie number of bits of the discrete values.

The output selector 40 includes a switch element. The switch element obtains each piece of pixel data of image data to be recorded from the controller 80 in synchronization with the clock signal. The switch element switches whether to output output signals from the drive circuit 30 to the actuators 51 by switch signals corresponding to the pieces of pixel data. Although the pixel data is not particularly limited, the pixel data in the embodiment is binary data that indicates only presence or absence of ink discharge. In the output selector 40, information on nozzles (pixels) for which ink ejection operation is performed within one clock cycle is maintained for each raster. The switch element is switched on and off according to the binary value. The number of actuators 51 and switch elements corresponding to one drive circuit 30 is, for example, 256 or 1024. Therefore, the more switch elements that are turned on, the greater the total load (current) of the actuators 51 to which output signals from the drive circuit 30 are supplied (applied).

The DC voltage converter 60 converts a source voltage Vdd to a stable supply voltage Vp by DC-DC conversion and outputs it. In the embodiment, the source voltage Vdd may be equal to the supply voltage Vp. The power source voltage Vdd should be as small as possible within a range where a signal output to the actuator 51 is not distorted. In a case where the source voltage Vdd and the supply voltage Vp are equal, the DC voltage converter 60 need not be provided. The power source voltage Vdd is supplied from an external power supply (not shown). The supply voltage Vcc of an OP amplifier 311*a* (see FIG. 3) and the supply voltage Vcc in a case where the voltage plane Vc is not a ground voltage may be supplied from the DC voltage converter 60 after being converted likewise as necessary.

The drive circuit 30 includes a voltage amplifier 31, a bias voltage generator 32 (bias generator), a current amplifier 33, and a feedback unit 34. The drive waveform signal input from the DAC 20 is converted (amplified) such that it can output a voltage suitable for driving the actuator 51 and a necessary current.

The voltage amplifier 31 is located at the most upstream (first stage) of signals.

The voltage amplifier 31 includes:

a preceding-stage amplifier 311; and a subsequent-stage amplifier 312 (the second or subsequent amplifier from the upstream side of signals) which is located downstream from the preceding-stage amplifier and which is constituted by a bipolar transistor.

The voltage amuplifier 31 amplifies a voltage to a drive voltage in two (or more) steps of amplification.

Figure 3:
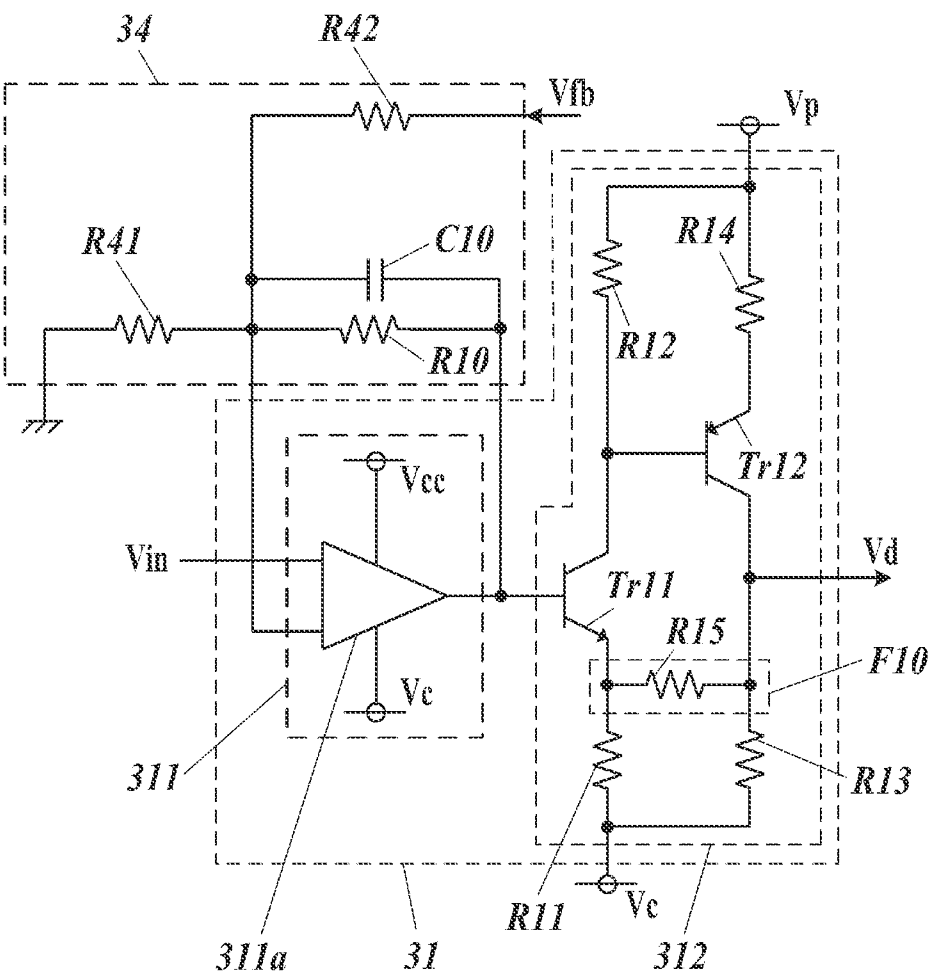
FIG. 3 illustrates a circuit configuration of a voltage amplifier and a feedback circuit.

FIG. 3 illustrates a circuit configuration of the voltage amplifier 31 and the feedback unit 34.

The preceding-stage amplifier 311 uses an OP amplifier 311*a* (operational amplifier) to perform amplification. The input signal Vin output from the DAC 20 is input to a non-inverting input of the OP amplifier 311*a* of the preceding-stage amplifier 311. A feedback signal from the feedback unit 34 is input to an inverting input of the OP amplifier 311*a*. Thus, the preceding-stage amplifier 311 performs differential amplification to stabilize an output voltage. The signal amplified by the OP amplifier 311*a* is sent to the feedback unit 34 and also to the subsequent-stage amplifier 312.

The subsequent-stage amplifier 312 performs amplification using a transistor (bipolar transistor). In the subsequent-stage amplifier 312, an npn type transistor Tr11 and a pup type transistor Tr12 are provided to form an emitter ground circuit between a supply voltage Vp and a voltage Vc (e.g., a ground voltage or −Vp), respectively. The transistors Tr11, Tr12 are connected in series. The subsequent-stage amplifier 312 further amplifies the voltage signal amplified by the OP amplifier 311*a*. Resistance elements R11-R14 are defined according to amplification factors of the npn type transistor Tr11 and the pnp-type transistor Tr12 and the like. A resistance element R15 connects the two emitter ground circuits. The resistance element R15 feeds back an output of the subsequent-stage, i.e., the pnp type transistor Tr12, to the preceding-stage. i.e., the npn type transistor Tr11 The resistance element R15 causes the output current of the pup type transistor Tr12 to control a collector current of the npn type transistor Tr11. Amplification of the npn type transistor Tr11 in the first stage is suppressed according to a ratio of a feedback current.

A ratio of the voltage amplification factor by the preceding-stage amplifier 311 to the voltage amplification factor by the subsequent-stage amplifier 312 is not particularly limited. Usually it is not extremely biased toward one side. If an emitter ground circuit is simply stacked in the subsequent-stage amplifier 312 to increase the amplification factor, a gain in a high frequency band is reduced. Therefore, a negative feedback circuit F10 (signal feedback unit) is provided in the subsequent-stage amplifier 312. It increases frequency response of an output signal. It is recommended that a bipolar transistor that supports high voltages and high slew rates be selected when necessary. The same applies to bipolar transistors described below that are used in configurations of the subsequent-stage amplifier 312 and subsequent components. To secure a gain in a high frequency band, an input capacitance of the bipolar transistor may be set to a small value.

The resistance element R15 forms a negative feedback circuit F10. The resistance element R15 connects a collector terminal (drive voltage signal Vd) to an emitter terminal. The collector terminal is an output side of emitter ground amplification in the second stage by the transistor Tr12. The emitter terminal is an input side of emitter ground amplification in the first stage by the transistor Tr11. The resistance element R15 causes local negative feedback of the drive voltage signal Vd. For example, an output current of the transistor Tr12 decreases in accordance with increase of a feedback current according to an output voltage. Thereby, an input to the transistor Tr11 is reduced and the feedback current is also reduced. Such local negative feedback stabilizes a gain and improves frequency response of an output signal.

It is recommended that the resistance element R12 be defined such that an input (base) voltage to the transistor Tr12, i.e., an output (collector) voltage of the transistor Tr11, is not significantly reduced from the supply voltage Vp. It suppresses degradation of high frequency response in response to increase in apparent capacitance due to mirror effect of emitter grounding. For example, it may be defined such that the value (potential difference, or difference) obtained by subtracting an output voltage of the transistor Tr11 (emitter ground circuit at an input end of the subsequent-stage amplifier 312) from the supply voltage Vp (potential of a supplied power source voltage) is within 2 V (predetermined reference voltage). In the embodiment, 2V, which is about three times a voltage between base and emitter of the transistor Tr12, is the predetermined reference voltage. It can sufficiently suppress a current flowing through the resistance element R12. A collector potential of the transistor Tr11 is not clipped. Loss of operation is stably small. The predetermined reference voltage may be adjusted slightly (e.g., about 34V) depending on a range of an output voltage as long as it is within a range (lower limit) where an output voltage of tie transistor Tr11 will not be clipped or problems do not occur in operation of the transistor Tr12.

The feedback unit 34 combines a feedback signal Vfb fed back from an output of the current amplifier 33 with an output signal of the preceding-stage amplifier 311. The feedback unit 34 feeds it back negatively to an input of the preceding-stage amplifier 311. The feedback unit 34 includes resistance elements R41, R42, R10 and a capacitor C10.

The resistance elements R41, R42 divide a signal between the feedback signal Vfb and a ground voltage. The voltage signal that has been divided is combined with a voltage signal for an output of the OP amplifier 311*a* and is input to an inverting output of the OP amplifier 311*a*. A ratio of resistance values of the resistance elements R41, R42 is determined according to a voltage amplification ratio of the voltage amplifier 31. This results in synthesis of a signal with the same amplitude as an input voltage.

An output of the OP amplifier 311*a* is synthesized with a voltage signal pertaining to the feedback signal Vfb through a resistance element R10 and a capacitor C10 which are connected in parallel. It is returned to an inverting input of the OP amplifier 311*a*. The resistance element R10 and the capacitor C10 constitute a low-pass filter (LPF) (low-pass section). The low-pass filter superimposes a low-frequency component in an output signal of the OP amplifier 311*a* onto the feedback signal Vfb. It is a feedback signal. It prevents oscillation related to influence of (i) phase shift between inverting input and non-inverting input due to negative feedback. (ii) a frequency component less than a response time of a voltage according to the negative feedback, etc. It reduces a delay component included in the feedback signal Vfb due to influence of a capacitive component of the actuator 51 and the like. An appropriate waveform signal in which linear responsivity of the feedback signal Vfb is reduced, i.e., distortion is suppressed, is output from the OP amplifier 311*a*.

Figure 4:
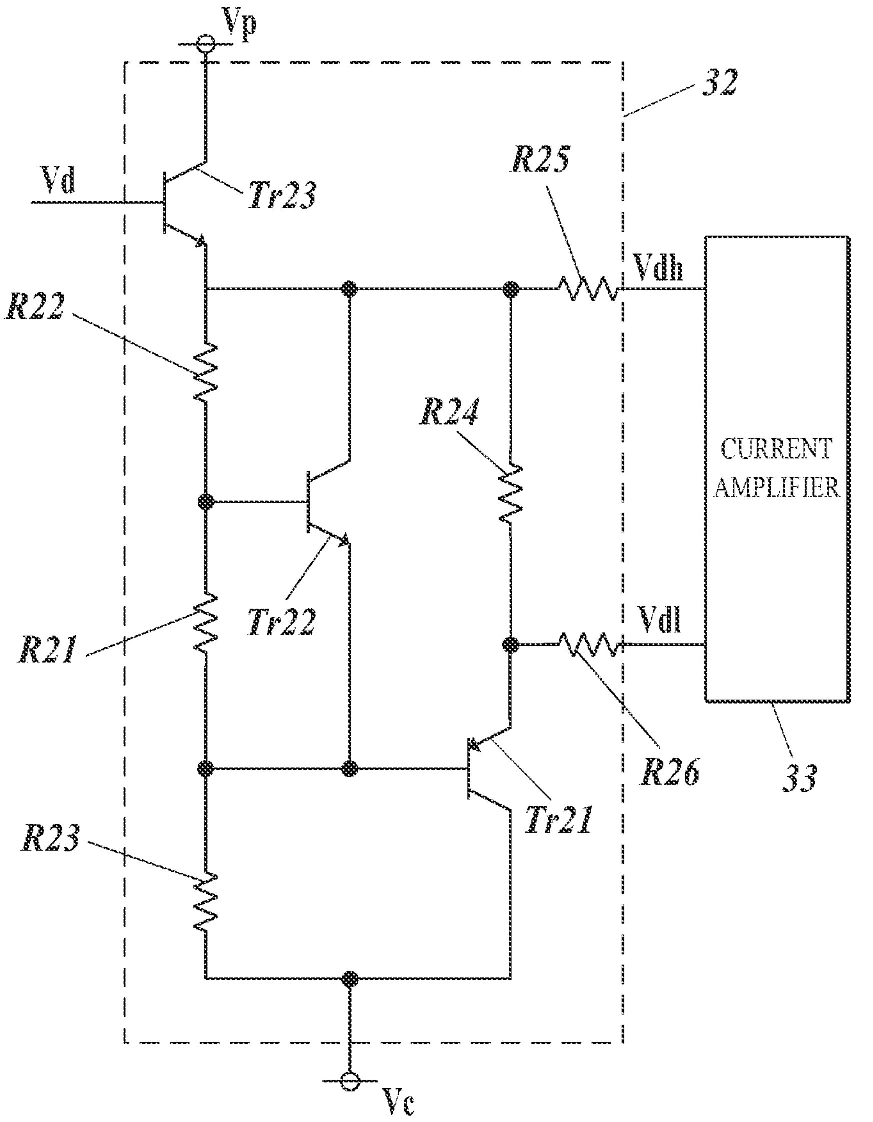
FIG. 4 shows a circuit configuration of a bias voltage generator.

FIG. 4 shows a circuit configuration of the bias voltage generator 32.

In response to the drive voltage signal Vd obtained in the voltage amplifier 31, the bias voltage generator 32 generates a bias voltage between the voltages (gate voltages) respectively input to the two transistors for push-pull operation used in the current amplifier 33. It suppresses distortion of the output signal Vout of the current amplifier 33 and reduces a current during idle time. The bias voltage generator 32 includes transistors Tr21-Tr23 and resistance elements R21-R26.

The transistors Tr21. Tr23 are emitter followers, respectively, and adjust a current according to a capacitance of the output side.

The resistance elements R25, R26 prevent oscillation of the two transistors Tr31. Tr32 in the current amplifier 33.

In the bias voltage generator 32, the transistor Tr22 and the resistance elements R21, R22 generate a bias voltage. The transistor Tr22 is between two input ends (gates of the transistors Tr31, Tr32) of the current amplifier 33.

The transistor Tr22 is a bipolar transistor and includes:

a collector connected to an output side of a drive signal Vdh; and an emitter connected to an output side of a drive signal Vdl.

The resistance element R21 connects the base and emitter of the transistor Tr22. The resistance element R22 connects the base and collector of the transistor Tr22.

The resistance elements R21. R22 determine magnitude of a bias (bias voltage) between voltages of drive signals Vdh, Vdl. i.e., a voltage between collector and emitter of the transistor Tr22 In the embodiment, the transistors Tr31, Tr32 may be in an enhanced mode. The current amplifier 33 may be a Class B amplifier. In that case, magnitude of the bias voltage may be smaller than the sum of voltages between gate and source (operation threshold voltages) of two transistors Tr31, Tr32 in the current amplifier 33. A voltage applied to the resistance element R24 is the bias voltage minus a voltage between base and emitter of the transistor Tr21. A voltage applied to the resistance element R23 corresponds to a voltage between base and collector of the transistor Tr21.

Figure 5:
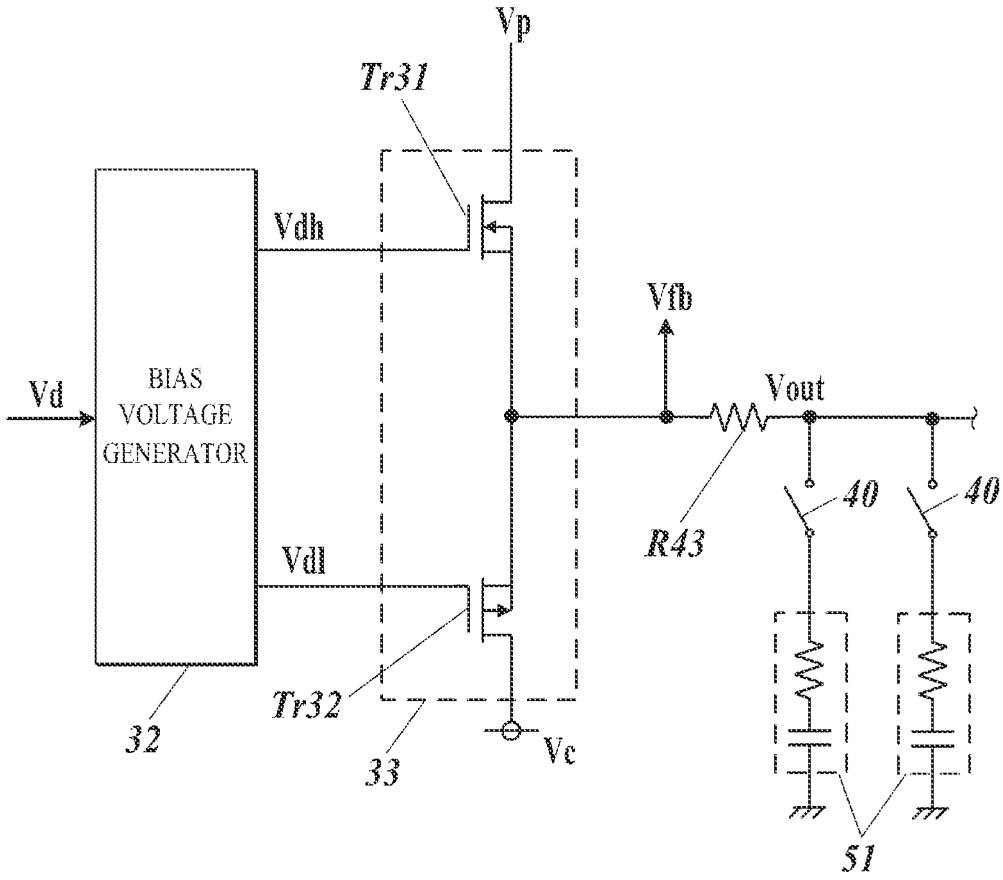
FIG. 5 shows a circuit configuration of a current amplifier.

FIG. 5 is a circuit configuration diagram showing the current amplifier 33 and its output.

The current amplifier 33 in the embodiment includes two transistors Tr31, Tr32 (two sets of transistors). Tie transistor Tr31 is a p-channel FET. The drive signal Vdh is input to the transistor Tr31. The transistor Tr32 is an n-channel FET. The drive signal Vdl, which is lower in voltage by the above bias voltage than the drive signal Vdh, is input to the transistor Tr32. Each source terminal of the transistors Tr31, Tr32 is connected to the output respectively to form a push-pull type source follower. It amplifies a current.

An output signal of the current amplifier 33 is sent to the feedback unit 34 as a feedback signal Vfb and is input to a resistance element R43 The resistance element R43 is a terminating resistor and absorbs influence of load fluctuation of the inkjet head 50 (actuator 51). The output signal Vout is output, from an end (other end) of the resistance element R43 opposite to a side (one end) connected with the current amplifier 33, to the actuators 51 (load) selected according to operation of the output selector 40 (switch element).

In the drive circuit 30, the above circuit configuration, especially the feedback unit 34, the resistance element R15 for negative feedback (negative feedback circuit F10) and the resistance element R43 which is a terminating resistor, reduce influence of load and distortion of the output signal Vout according to fluctuation thereof.

Figure 6:
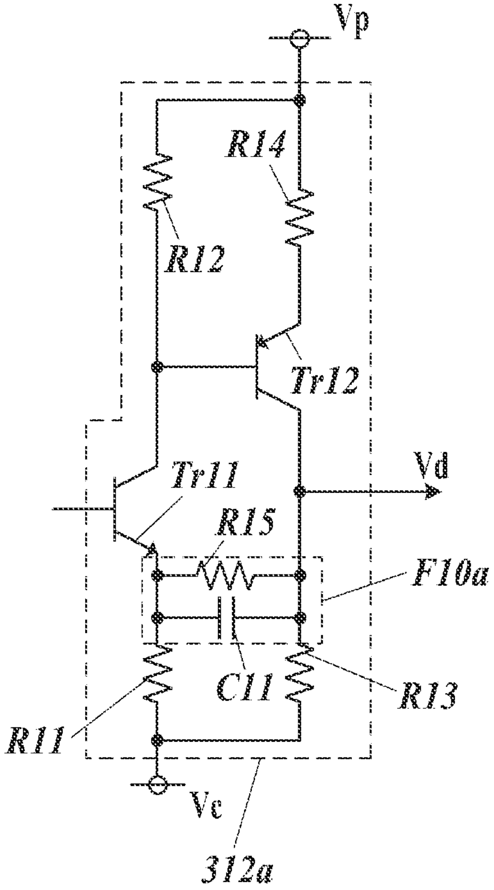
FIG. 6 shows a circuit configuration of Modification 1 of a subsequent-stage amplifier.

FIG. 6 shows a circuit configuration of the subsequent-stage amplifier 312*a* of Modification 1.

In Modification 1, the subsequent-stage amplifier 312 has a negative feedback circuit F10*a* instead of the negative feedback circuit F10. In the negative feedback circuit F10*a*, the resistance element R15 and the capacitor C11 are provided in parallel between a collector (output) of the transistor Tr12 and an emitter (input) of the transistor Tr11. The negative feedback circuit F10*a* improves phase characteristics of an output signal, especially on the high frequency side.

Figure 7:
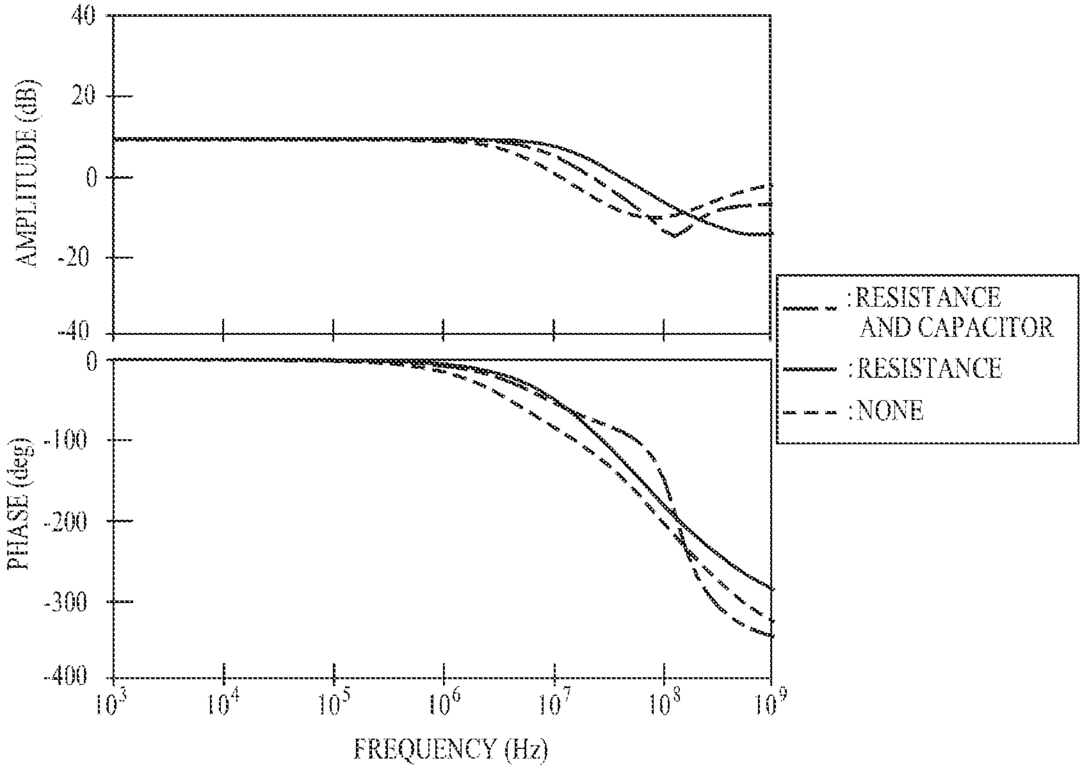
FIG. 7 shows calculation result of frequency response of an output signal according to a negative feedback circuit

FIG. 7 is a graph showing results of simulated frequency response of amplitude and phase according to presence and absence of a negative feedback circuit in the subsequent-stage amplifier 312.

The Graph Shows:

a case with no negative feedback circuit:

a case with the negative feedback circuit F10 (resistance element); and a case with the negative feedback circuit F10*a* (a resistance element and a capacitor arranged in parallel).

It is known from the graph that the negative feedback circuit improves high frequency response of amplitude and phase. Further, addition of a capacitor improves phase characteristics.

Figure 8A:
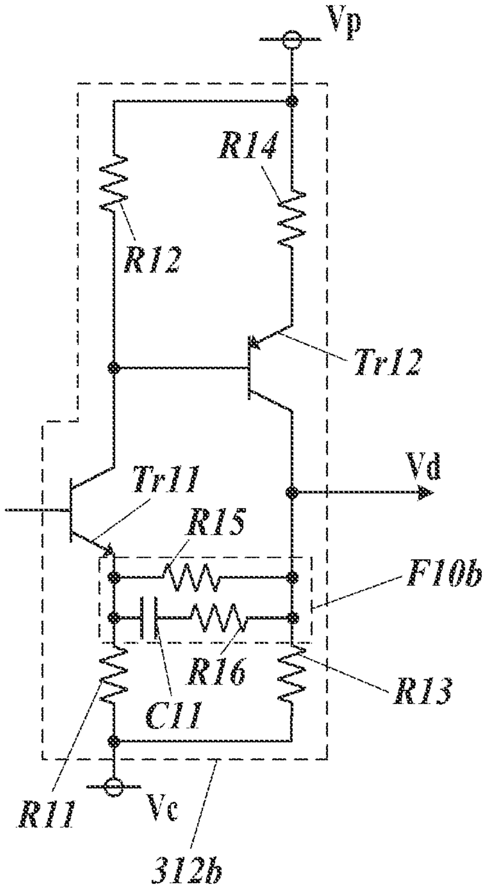
FIG. 8A shows a circuit configuration of Modification 2 of the subsequent-stage amplifier.
Figure 8B:
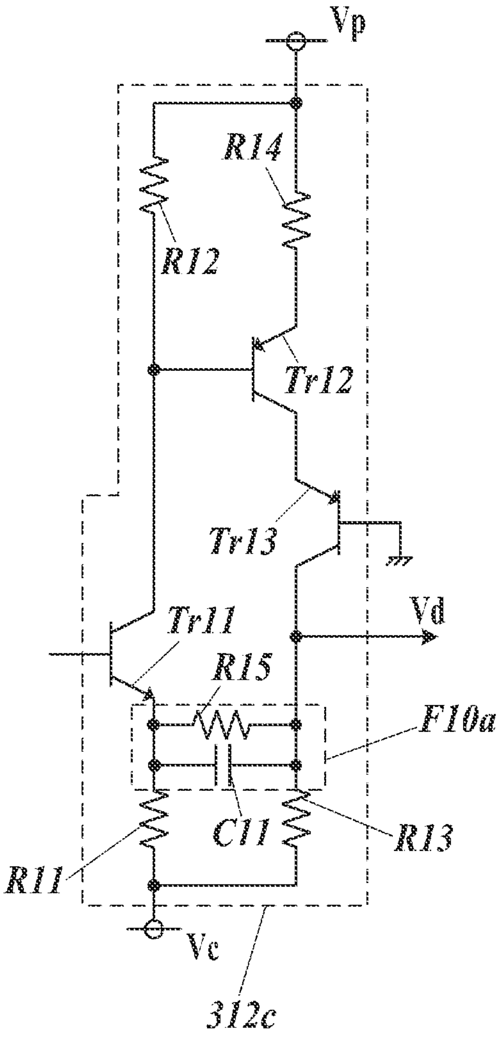
FIG. 8B shows a circuit configuration of Modification 3 of the subsequent-stage amplifier.

FIG. 8A shows a circuit configuration of the subsequent-stage amplifier 312*b* in Modification 2. FIG. 8B shows a circuit configuration of the subsequent-stage amplifier 312*c* in Modification 3.

In the negative feedback circuit F10*b* in FIG. 8A, a pair of a resistance element R16 and a capacitor C11 in series is located in parallel to the resistance element 15. Such a circuit also improves characteristics of amplitude and phase. It is easy to adjust especially the phase characteristics according to a desired frequency and so on.

The negative feedback circuit F10*a* in FIG. 8B is the same as the one in Modification 1. On the other hand, in the subsequent-stage amplifier 312*c* of Modification 3, the first stage is an emitter ground circuit. The second stage is a cascode circuit of transistors Tr12, Tr13. The transistor Tr13 has the same polarity as the transistor Tr12, and is a pnp type transistor. Abase of the transistor Tr13 is grounded (The base may be AC grounded, and a DC voltage source (not shown) may apply a suitable DC bias voltage). An emitter of the transistor Tr13 is connected to a collector of the transistor Tr12. Thereby, the drive voltage signal Vd is output from a collector of the transistor Tr13.

The subsequent-stage amplifier 312*d* having the cascode circuit including the base ground portion as described above suppresses mirror effect. It can amplify and output an accurate signal, which is more reflective of an input signal.

Figure 9:
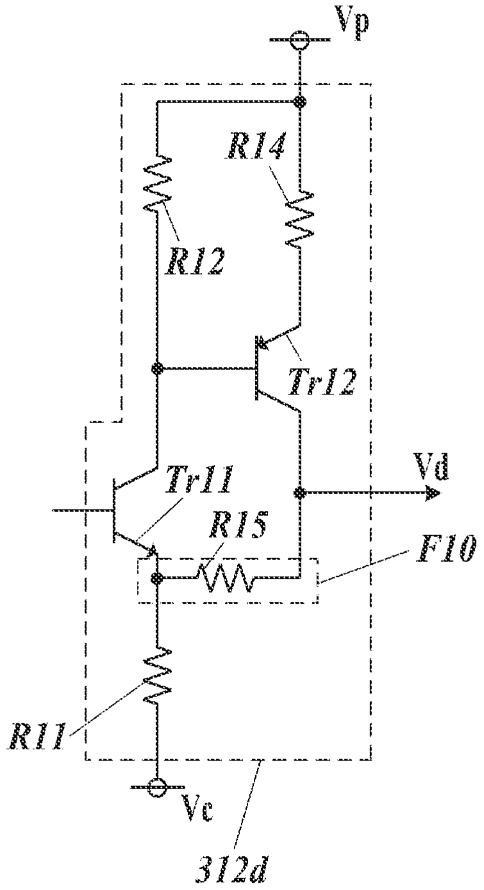
FIG. 9 shows a circuit configuration of Modification 4 of the subsequent-stage amplifier.

FIG. 9 shows a circuit configuration of the subsequent-stage amplifier 312*d* of Modification 4.

The subsequent-stage amplifier 312*d* does not have the resistance element R13 in each of the subsequent-stage amplifiers 312, 412*a* to 312*c* of the embodiment and Modifications 1-3. Therefore, a collector current of the transistor Tr13 flows through the resistance elements R15. R11 to the voltage plane Vc. This configuration with negative feedback can also improve frequency response of an output signal in the same way as described above.

Figure 10:
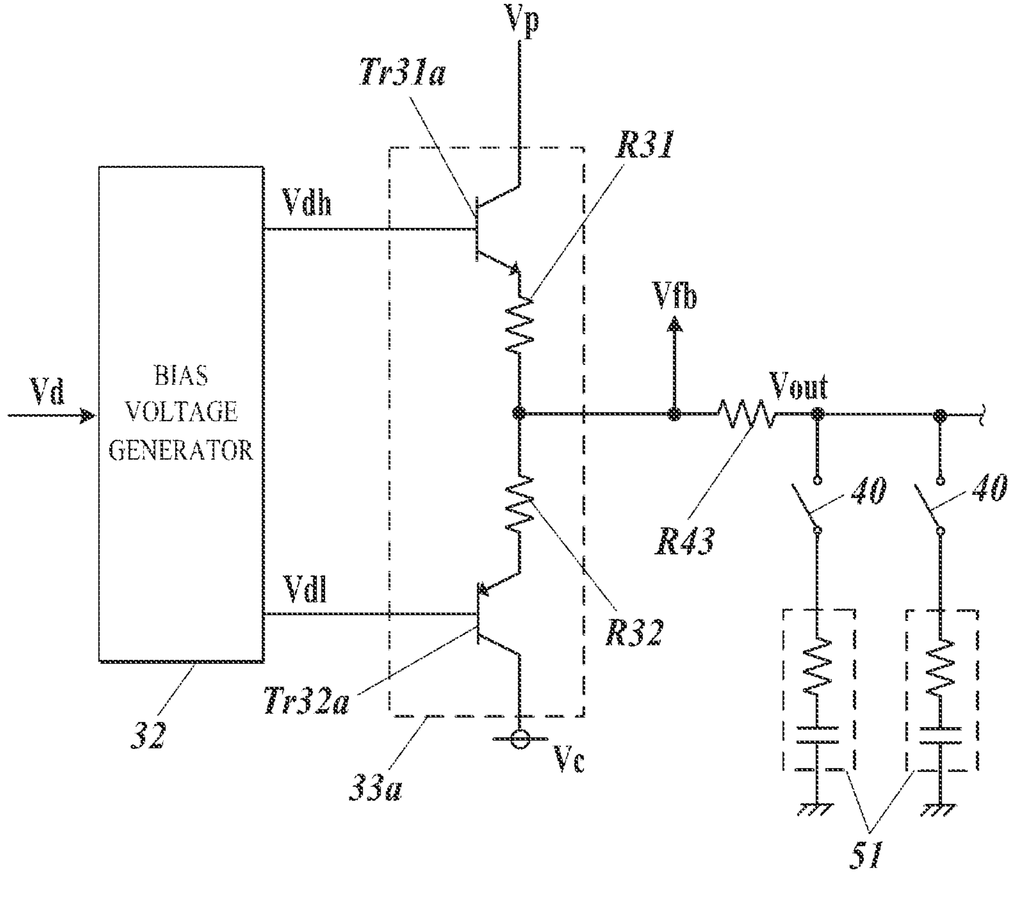
FIG. 10 shows a circuit configuration of a modification of the current amplifier.

FIG. 10 shows a circuit configuration of the current amplifier 33*a* in a modification.

The current amplifier 33*a* has an emitter follower push-pull configuration of bipolar transistors Tr31*a*, Tr32*a* instead of a source follower push-pull configuration of FETs in the current amplifier 33. In this case, resistance elements R31, R32, which limit a current, are provided between an emitter of the transistor Tr31*a* and an emitter of the transistor Tr32*a*. They inhibit thermal runaway.

In this case, the bias voltage generator 32 need not have the resistance elements R25, R26 that prevent oscillation. Further, in this case, voltages between base and emitter may be aligned by thermally coupling the transistor Tr22 of the bias voltage generator 32 with the transistors Tr31*a*. Tr32*a*. The current amplifier 33*a* may be a Class B amplifier as in the above embodiment. A bias voltage may be smaller than the sum of voltages between base and emitter (operation threshold voltages) of the transistors Tr31*a*, Tr32*a*.

As described above, the drive circuit 30 of the embodiment supplies an output signal of power corresponding to operation of the actuator 51 to the actuator 51, which is for recording operation by the recording element of the inkjet head 50 provided with tie recording element. The drive circuit 30 includes a voltage amplifier 31 that amplifies a voltage of the input signal Vin (analog drive waveform signal) for operation of the recording element to generate the drive voltage signal Vd. The voltage amplifier 31 includes amplifiers. Among the amplifiers, at least one of the subsequent-stage amplifiers 312, which are the second and subsequent amplifiers from the upstream side, includes the negative feedback circuit F10. The negative feedback circuit F10 returns a signal to be output to an input side of the subsequent-stage amplifier 312. It improves frequency response to the high frequency side in an image recorder with a high amplification factor. A drive signal with high waveform accuracy can be easily and stably output to the actuator 51. It properly maintains quality of images by the inkjet recorder 1.

The subsequent-stage amplifier 312 has the transistors Tr11. Tr12 that perform amplification. The subsequent-stage amplifier 312 accurately generates and outputs an amplified signal having a large voltage and changing at a high speed by transistor amplification. Distortion of waveforms is small.

The negative feedback circuit F10 is included in the one with the highest amplification factor among the subsequent-stage amplifiers 312. Mirror effect has a large influence on circuits with a large amplification factor. Negative feedback in the circuit with the highest amplification factor effectively improves frequency response.

The subsequent-stage amplifier 312 includes two emitter ground circuits. The negative feedback circuit F10 connects the two emitter ground circuits. Thereby a high amplification rate is achieved efficiently. Degradation of frequency response of a signal during amplification is suppressed.

The subsequent-stage amplifier 312 includes an emitter ground circuit and a cascode circuit. The negative feedback circuit F10*a* connects a collector on an output side of the cascode circuit to an emitter of the emitter ground circuit Thus, the cascode circuit is located in the second stage and the last transistor is the base ground circuit. It thereby achieves a high amplification factor while effectively suppressing influence of mirror effect. It keeps good frequency response of signals.

A potential difference between a supply voltage Vp and an output voltage of the transistor Tr11 of an emitter ground circuit at an input end of the subsequent-stage amplifier 312 is less than a predetermined reference voltage (2V). Thus, an output voltage of the emitter ground circuit in the first stage is maintained, so influence of mirror effect is less likely to occur. It suppresses degradation of frequency response of signals.

An OP amplifier 311*a* is used as the preceding-stage amplifier 311 in the first stage among the amplifiers. Since the OP amplifier 311*a* performs differential amplification first, oscillation is easily suppressed.

The drive circuit 30 includes the current amplifier 33 which amplifies a current of the drive voltage signal Vd and outputs it as the output signal Wout. Since the current is amplified in the final stage and is output, it effectively responds to large current fluctuation according to presence and absence of operation of the many actuators 51. Stable power is output.

The drive circuit 30 includes the feedback unit 34 which negatively feeds back the feedback signal Vfb corresponding to a voltage of the output signal Vout to the voltage amplifier 31. It better suppresses influence, such as feedback signal delays, power losses, fluctuations in the supply voltage Vp, due to capacitive components of the actuator 51, etc. The output signal Wout with a good waveform and good frequency response is finally output.

The current amplifier 33 amplifies a current by push-pull operation of two sets of transistors Tr31. Tr32. It reduces current consumption in standby mode. Therefore, the output signal but having an amplified proper drive waveform is output more efficiently.

The two sets of transistors Tr31. Tr32 are both FETs. Therefore, thermal runaway, etc. is unlikely to occur. Tie output signal but with a good waveform is output stably.

The two sets of transistors Tr31*a*, Tr32*a* are both bipolar transistors. In that case, the operation threshold voltage is lower than that of an FET. Each operation threshold voltage is stabilized to a voltage corresponding to one diode. Therefore, the output signal Vout having a stable waveform is output more efficiently.

The drive circuit 30 includes the bias voltage generator 32 which generates a predetermined bias voltage between the drive signals Vdh, Vdl supplied to the two sets of transistors Tr31, Tr32, respectively. It narrows a dead zone in which neither of the two sets of transistors Tr31, Tr32 operate. Distortion of a waveform of the output signal Vout is suppressed.

A bias voltage (difference between the drive signals Vdh. Vdl) generated by the bias voltage generator 32 is smaller than the sum of operation threshold voltages (voltage between gate and source, or voltage between base and emitter) of the two sets of transistors Tr31, Tr32. Thus, the Class B amplifier effectively reduces power consumption during idle time.

The bias voltage generator 32 includes:

a bipolar type transistor Tr22 connected between input ends of two sets of transistors Tr31, Tr32; and resistance elements R21, R22 connecting (i) base and emitter, and (ii) base and collector of the bipolar type transistor Tr22, respectively.

Thereby an appropriate bias voltage is generated with a simple configuration. It does not increase effort and cost.

The drive circuit 30 includes the resistance element R43 having one end connected to an output of the current amplifier 33. The drive circuit 30 outputs the output signal Vout from an end of the resistance element R43 opposite to the current amplifier 33. Thus, a termination resistor is provided at a termination on an output side. It absorbs influence of fluctuation when load of the actuator 51 fluctuates significantly. It prevents bad influence on components of the drive circuit 30, which destabilizes and degrades signals.

The inkjet recorder 1 of the embodiment includes the drive circuit 30 and the inkjet printhead 50 to which output signals are input. A drive signal having good frequency response is stably input to the inkjet printhead 50 from the drive circuit 30. Therefore, the inkjet recorder 1 records and outputs images that maintain proper quality in a stable manner.

The voltage amplifier 31 may include the subsequent-stage amplifiers 312 connected in series. In that case, amplification factors of the subsequent-stage amplifiers 312 may be different. The order of npn type transistors and pnp type transistors may be swapped as appropriate. The negative feedback circuit F10 may not be provided in all of the subsequent-stage amplifiers 312. For example, the negative feedback circuits may be provided in some of them, including the one with the highest amplification factor.

The subsequent-stage amplifier 312 is not limited to a combination of two emitter ground circuits, or a combination of an emitter ground circuit and a cascode circuit. Bootstrapping may be applied to the cascode circuit. The subsequent-stage amplifier 312 may include an OP amplifier. In that case, the OP amplifier may not be used directly for amplification.

In the embodiment, the preceding-stage amplifier 311 performs amplification by the OP amplifier 311*a*, but the invention is not limited thereto.

In the embodiment, the current amplifier 33 performs a push-pull operation with two transistors to amplify a current. Alternatively, the two sets of transistors may each have transistors connected by Darlington connection or inverted Darlington connection or the like.

In the embodiment, the DAC 20 performs analog conversion on digital signals for drive waveforms, and amplifies a voltage and a current. Instead, an analog signal may be obtained from an external source, simply amplified, and output. Conversely, the DAC 20 and the drive circuit 30 may be provided together on one substrate (chip). The drive waveform signal output 10 may also be provided together with the drive circuit 30 on the same substrate (chip).

In the embodiment, only presence and absence of ink ejection is switched. Alternatively, an ink discharge rate may be switched in multiple steps. In that case, the number of drive waveform types can be increased. Alternatively, one ink ejection can be performed by a combination of multiple drive waveforms.

In the embodiment, a piezoelectric inkjet recorder in which a piezoelectric element is used as a load element is described as an example. The present invention can also be applied to a thermal inkjet recorder in which heat generated by a resistance element or the like bubbles ink to apply pressure. In a case where the piezo type is used, influence of capacitive load of the piezoelectric element is more likely to appear in feedback signals than the thermal type. Effect of improvement of stability by synthesizing the output signal Vout and an output voltage signal of the OP amplifier 31*a* and by making negative feedback is likely to be larger.

In the embodiment, an inkjet recorder in which nozzles that discharge ink are arranged as recording elements is described as an example. The present invention may also be applied to other image recorders, such as LED printers, which record images by operating arranged recording elements.

The circuit configuration described above is a basic part. Resistance elements and/or capacitors, etc., can be provided at known locations to stabilize signals.

Specific details shown in the embodiments can be changed within the scope of the claims of the present invention.

INDUSTRIAL APPLICABILITY

The present invention can be used in a drive circuit of a recording head and an image recorder.

REFERENCE SIGNS LIST

1 inkjet recorder
10 drive waveform signal output
11 controller
12 memory
15 resistance element
20 analog converter
30 drive circuit
31 voltage amplifier
311 preceding-stage amplifier
311*a* OP amplifier
312, 312*a*-312*d* subsequent-stage amplifier
32 bias voltage generator
33, 33*a* current amplifier
34 feedback unit
40 output selector
50 inkjet head
51 actuator
60 DC voltage converter
100 drive unit
F10, F10*a*, F10*b* negative feedback circuit
Vd drive voltage signal
Vfb feedback signal
Vin input signal
Vout output signal
Vp supply voltage

The invention claimed is:

1. A drive circuit of a recording head having a recording element, the drive circuit supplying a load element for recording operation of the recording element with an output signal of electric power according to operation of the load element, and the drive circuit comprising:

a voltage amplifier that amplifies a voltage of an analog drive waveform signal for operation of the recording element to generate a drive voltage signal, wherein the voltage amplifier includes amplifiers, and among the amplifiers, at least one of subsequent-stage amplifiers which are a second and subsequent amplifiers from an upstream side includes a signal feedback unit that returns a signal to be output to an input side of the subsequent-stage amplifiers.

2. The drive circuit for the recording head according to claim 1, wherein each of the subsequent-stage amplifiers includes a transistor that performs amplification.

3. The drive circuit for the recording head according to claim 2, wherein the subsequent-stage amplifiers include two emitter ground circuits, and the signal feedback unit connects the two emitter ground circuits.

4. The drive circuit for the recording head according to claim 3, wherein a potential difference between a supplied source voltage and an output voltage of a transistor of the emitter ground circuit at an input end of the subsequent-stage amplifier is equal to or less than a predetermined reference voltage.

5. The drive circuit for the recording head according to claim 2, wherein the subsequent-stage amplifiers include an emitter ground circuit and a cascode circuit, and the signal feedback unit connects a collector on an output side of the cascode circuit to an emitter of the emitter ground circuit.

6. The drive circuit for the recording head according to claim 2, wherein an operational amplifier is used as a preceding-stage amplifier which is a first amplifier among the amplifiers.

7. The drive circuit for the recording head according to claim 1, wherein the signal feedback unit is included in one of the subsequent-stage amplifiers which has a highest amplification factor.

8. The drive circuit for the recording head according to claim 1, further comprising:

a current amplifier that amplifies a current of the drive voltage signal and outputs the amplified current as the output signal.

9. The drive circuit of the recording head according to claim 8, further comprising:

a feedback unit that negatively feeds back a feedback signal according to a voltage of the output signal to the voltage amplifier.

10. The drive circuit of the recording head according to claim 8, wherein the current amplifier comprises two sets of transistors that amplify a current by push-pull operation.

11. The drive circuit of the recording head according to claim 10, wherein the two sets of transistors are both FETs.

12. The drive circuit of the recording head according to claim 10, wherein the two sets of transistors are both bipolar transistors.

13. The drive circuit of the recording head according to claim 10, further comprising:

a bias generation unit that generates a predetermined bias voltage between the drive voltage signals supplied to the two sets of transistors.

14. The drive circuit for the recording head according to claim 13, wherein the bias voltage generated by the bias generator is smaller than a sum of operation threshold voltages of the two sets of transistors.

15. The drive circuit of the recording head according to claim 13, wherein the bias generation unit includes:

a bipolar transistor connected between input ends of the two sets of transistors; and resistance elements that connect (i) a base and an emitter and (ii) the base and a collector of the bipolar transistor, respectively.

16. The drive circuit of the recording head according to claim 8, further comprising:

a resistance element that includes:

one end connected to an output of the current amplifier; and another end that outputs the output signal.

17. An image recorder, comprising:

the drive circuit of the recording head according to claim 1; and the recording head to which the output signal is input.

18. The drive circuit for the recording head according to claim 1, wherein the signal feedback unit returns the signal to be output from an output side of the at least one of subsequent stage amplifiers to an input side of the at least one of subsequent stage amplifiers.

19. The drive circuit for the recording head according to claim 1, wherein the signal feedback unit is internal to the at least one of subsequent-stage amplifiers.

* * * * *